United States Patent
Jia

(10) Patent No.: US 7,830,951 B2
(45) Date of Patent: Nov. 9, 2010

(54) EFFICIENT AND FLEXIBLE NUMERICAL CONTROLLED OSCILLATORS FOR NAVIGATIONAL RECEIVERS

(75) Inventor: Zhike Jia, San Jose, CA (US)

(73) Assignee: SiRF Technology Holdings, Inc., San Jose, CA (US)

(*) Notice: Subject to any disclaimer, the term of this patent is extended or adjusted under 35 U.S.C. 154(b) by 793 days.

(21) Appl. No.: 11/694,296

(22) Filed: Mar. 30, 2007

(65) Prior Publication Data
US 2008/0240309 A1 Oct. 2, 2008

(51) Int. Cl.
*H04B 1/00* (2006.01)
*H04L 27/06* (2006.01)
(52) U.S. Cl. .................................. 375/147; 375/344
(58) Field of Classification Search .............. 375/140, 375/147, 149–150, 313, 343, 344, 377, 145, 375/327; 329/345–347; 342/357.01, 357.05–357.06, 342/357.08, 357.12, 386, 450, 89, 98, 411, 342/417; 701/207, 213, 214; 327/100, 126; 331/1 A, 44, 177 R, 179
See application file for complete search history.

(56) References Cited

U.S. PATENT DOCUMENTS

| | | | |
|---|---|---|---|
| 5,192,957 A | | 3/1993 | Kennedy |
| 5,610,984 A * | | 3/1997 | Lennen ...................... 380/270 |
| 5,650,785 A * | | 7/1997 | Rodal ..................... 342/357.12 |
| 5,663,733 A * | | 9/1997 | Lennen .................. 342/357.12 |
| 5,874,913 A * | | 2/1999 | Blanchard et al. ........... 342/352 |
| 5,878,330 A * | | 3/1999 | Naumann .................... 455/71 |
| 6,311,129 B1 * | | 10/2001 | Lin ............................. 701/214 |
| 6,496,533 B2 * | | 12/2002 | Lennen ....................... 375/147 |
| 6,597,729 B1 * | | 7/2003 | Schmidl et al. ............. 375/149 |
| 6,775,319 B2 * | | 8/2004 | King et al. .................. 375/150 |
| 6,914,931 B2 * | | 7/2005 | Douglas et al. ............. 375/147 |
| 6,954,114 B2 * | | 10/2005 | Schoner ................... 331/177 R |
| 6,965,754 B2 * | | 11/2005 | King ........................ 455/12.1 |
| 7,477,189 B2 * | | 1/2009 | Wang et al. ............ 342/357.15 |
| 2003/0078025 A1 * | | 4/2003 | Smee et al. .................. 455/307 |
| 2004/0043746 A1 * | | 3/2004 | Hiramatsu ................... 455/334 |
| 2004/0214538 A1 | | 10/2004 | Ballantyne et al. |
| 2005/0162306 A1 * | | 7/2005 | Babitch et al. ......... 342/357.05 |
| 2006/0251173 A1 | | 11/2006 | Wang et al. |
| 2007/0205940 A1 * | | 9/2007 | Yang et al. ............. 342/357.12 |
| 2008/0008278 A1 * | | 1/2008 | Kontola et al. .............. 375/354 |
| 2008/0037614 A1 * | | 2/2008 | Douglas ..................... 375/150 |

* cited by examiner

*Primary Examiner*—Tesfaldet Bocure
*Assistant Examiner*—Lawrence B Williams
(74) *Attorney, Agent, or Firm*—Pillsbury Winthrop Shaw Pittman LLP

(57) ABSTRACT

Provided herein are systems and methods for achieving long integration of an input signal by compensating the frequency and phase of each sample of the input signal. In an embodiment, a Numerical Controlled Oscillator (NCO) of the receiver is modified to include a variable control input that allows the output frequency of the NCO to be adjusted based on a rate of change of frequency. The rate of change of frequency may be estimated based on the relative velocity of a satellite to the receiver computed from satellite orbit parameters or ephemeris. The rate of change of frequency may also be estimated based on frequency measurements of previous samples. The modified NCO may be used as a carrier NCO or code NCO of the receiver to provide frequency and phase compensation of each sample of the input signal.

23 Claims, 5 Drawing Sheets

EFFICIENT AND FLEXIBLE NUMERICAL CONTROLLED OSCILLATORS FOR NAVIGATIONAL RECEIVERS

BACKGROUND OF THE INVENTION

1. Field of the Invention

The present invention relates generally to navigational signal receivers, and more particularly, to Numerical Controlled Oscillators (NCOs) for navigational signal receivers.

2. Description of the Related Art

Satellite-based radio navigation systems have become widely adopted in many commercial and military applications. Exemplary systems in operation or development include the NAVigation Satellite Timing and Ranging Global Positioning System (NAVSTAR GPS), the Global'naya Navigationnaya Sputnikovaya Sistema (GLONASS), a European satellite navigation system called GALILEO, the wide area augmentation system (WAAS), and the local area augmentation system (LAAS). These systems permit a user with an appropriate direct sequence spread spectrum (DSSS) signal receiver to determine his or her position with respect to the Earth. Direct Sequence Spread Spectrum is a modulation technique where a pseudorandom noise sequence directly phase modulates a data-modulated carrier. The DSSS signal has a noise-like spectrum and appears to be noise to all but the intended receiver.

As an example, the GPS constellation has 24 operational satellites. These satellites are positioned in six different orbital planes such that at any time a minimum of six satellites are visible to any user on the surface of the Earth, except in the polar region. The satellites operate in near circular 20,200 kilometers (about 12,000 miles) orbits at an inclination angle of 55 degrees and with approximately a 12-hour period.

Each satellite contains at least one atomic clock and transmits a navigation message that contains an accurate system time and its orbital position referenced to the atomic clock. The navigation message also contains clock behavior, status messages, and correction data such as ionospheric delay, time offset, etc. An almanac that gives the approximate data for each active satellite is also provided.

Each satellite transmits on two L-band frequencies: L1=1575.42 MHz and L2=1227.6 MHz. Three sets of pseudorandom noise (PRN or PN) ranging codes are in use: the coarse/acquisition (C/A) code, the precision (P) code, and the Y-code.

The C/A code set, also known as Gold code, has a 1.023 MHz chip rate. In spread spectrum technology, the term "chip" refers to a single bit of a pseudorandom sequence (PN-sequence) and the term "chip rate" refers to the rate at which bits of a PN-sequence are shifted. The Gold code therefore has a length of 1023 chips. The term "code" refers to the binary bit stream (the pseudorandom sequence) used to spread a signal over a wide range of frequencies for transmission. This spreading improves the accuracy of position estimation. Other advantages include interference rejection and low spectral power density, i.e., the power level at a given frequency.

A correlator at a receiver despreads this signal to the original data bandwidth by correlating it with a locally generated PN-sequence identical to and in synchronization with the PN-sequence used to spread the carrier at the radio transmitter, e.g., a GPS satellite vehicle (SV). Typically, this despreading occurs after the signal received at the antenna has been amplified and down-converted to a suitable low carrier frequency, also known as the intermediate frequency (IF). The hardware section associated with the amplification, down-conversion, and analog-to-digital conversion (ADC) is called the radio frequency (RF) stage. The other section, which processes the RF stage output and generates the position, velocity, and time information, is called the baseband (BB) stage.

There are two Numerically Controlled Oscillators (NCOs) in GPS baseband. One of the NCOs is used to generate the IF carrier frequency while the other is used to generate the code frequency, which corresponds to the PN code rate. The former is denoted as carrier NCO while the later is denoted as code NCO. The sampling rate at the BB stage can be any multiple of the PN code rate. A minimum of two samples per chip (bit) is needed, which results in a minimum sampling rate of 2.046 MHz. The sampled signals are then made available in two channels, one in-phase (I) and the other quadrature-phase (Q). The resulting signals are then correlated with the locally generated PN code. The local code generator is driven by a code NCO. The result of the correlation is sent to a processor and further processed to determine the code frequency and carrier frequency, as well as code phase and carrier phase. The processor sends a control signal to the code NCO and the carrier NCO so that they are in alignment with the input signal. Usually, this correction is not done every millisecond. It depends on the periods of the carrier frequency tracking loop and delay lock loop. In some cases, the correction period can be up to several seconds. Thus some average correction is applied to multiple samples. When the incoming signal is aligned with the locally generated PN code and carrier, the data bits in the signal can be extracted. The extracted data are used in computing the satellite position and hence the receiver's position, velocity, etc.

It is necessary to acquire the satellite signal in order to determine the pseudorange or approximate distance to the navigation satellite from the receiver and to extract the navigation data. The Direct Sequence Spread Spectrum (DSSS) signal employed requires a perfect correlation of the received signal with a locally generated PN code in order to acquire the signal. Additionally, the local carrier frequency should be sufficiently close to the received signal frequency, in which the closeness depends upon the intended length of integration or correlation. In the exemplary case of GPS, the first or short time integration is done over a length of 1023 chips with an associated time duration of 1 ms. This requires a residual carrier frequency of less than 500 Hz. Any increase in this residual frequency will result in some of the samples within the correlation or integration length being phase reversed with a negative contribution to the integration value. This decreased integration value results in the receiver not being able to acquire the signal. This problem becomes more pronounced as the coherent integration length is increased. In an exemplary case where the integration length is increased to say 2 ms the residual frequency needs to be less than 250 Hz. Thus the residual frequency puts a constraint on the coherent integration length. In such cases non-coherent integration in which small length coherent integration powers are considered is used. However, this is an inefficient method and so coherent integration is usually preferred.

The signal becomes weak due to receiver operation in indoor conditions or when the signals are blocked as in the case of foliage or urban canyon. A lengthy coherent integration, sometimes extending up to several hundred milliseconds, is needed to acquire the weak signal. In additions to this, several sequential correct signal confirmation stages may be required. The residue frequency error between the locally generated frequency and incoming IF signal from the RF module during this integration interval should be small and should not reduce the acquisition sensitivity. As an example, a Fast Fourier Transform (FFT) with downsampling can be used for long time coherent integration. In a case of, e.g., a 5120 ms length integration with a downsampling of 20 times, the resulting FFT points will be 256 with a corresponding frequency resolution of 0.2 Hz. That means that if the frequency change during the integration is more than 0.1 Hz, then the signal power will be dispersed to two or more frequency bins. This leads to the decrease of peak power and makes the acquisition or tracking sensitivity lower. Thus when the integration is long, the frequency change during the integration must be considered even though the receiver is static. The Doppler frequency change due to the satellite dynamics alone has an average value of 0.5 Hz/Sec with a maximum of 1 Hz/sec.

As already discussed earlier, the phase and frequency of the samples are corrected by the carrier NCO and code NCO with the same correction factor for a set of values. This correction factor being their average value does not correct each sample with correct phase and frequency values. Usually, the integration is done in two stages: separately computing the short or 1 ms integration and then integrating these short length integrations over the desired length with necessary phase correction for each of the short length integrations. This is how a typical long integration is presently carried out. An exemplary case has been explained in the U.S. patent application Ser. No. 11/123,861 filed May 6, 2005, which is incorporated herein by reference.

However, compensating the set of samples with their average phase does not remove the phase involved with each of the samples. In a set, such compensation may correctly compensate the center sample while leaving the remaining samples with some uncompensated phase error. This phase error increases as the sample position is farther away from the center. U.S. Pat. Nos. 5,365,182 and 5,192,957 disclose changing the phase compensation according to the Doppler frequency or the rate of change of distance between the receiver and the satellite, but do not attempt to compensate each sample individually. An individual phase compensation of the samples based on an estimation of the phase improves the associated long coherent integration performance.

Clearly, there is a need for better phase and frequency compensation of each samples in order to compute a long coherent integration.

BRIEF SUMMARY OF THE INVENTION

Provided herein are systems and methods for achieving long integration of an input signal by compensating the frequency and phase of each sample of the input signal.

In an embodiment, a Numerical Controlled Oscillator (NCO) of the receiver is modified to include a variable control input that allows the output frequency of the NCO to be adjusted based on a rate of change of frequency. The rate of change of frequency may be estimated based on the relative velocity of a satellite to the receiver computed from satellite orbit parameters or ephemeris. The rate of change of frequency may also be estimated based on frequency measurements of previous samples. The modified NCO may be used as a carrier NCO or code NCO of the receiver to provide frequency and phase compensation of each sample of the input signal. This frequency and phase compensation enables long coherent integration of the input signal, thereby increasing the sensitivity of the receiver. Embodiments of the invention may be realized both in software and hardware.

Other objects and advantages of the present invention will become apparent to one skilled in the art upon reading and understanding the preferred embodiments described below with reference to the following drawings.

DETAILED DESCRIPTION OF THE INVENTION

Figure 1:
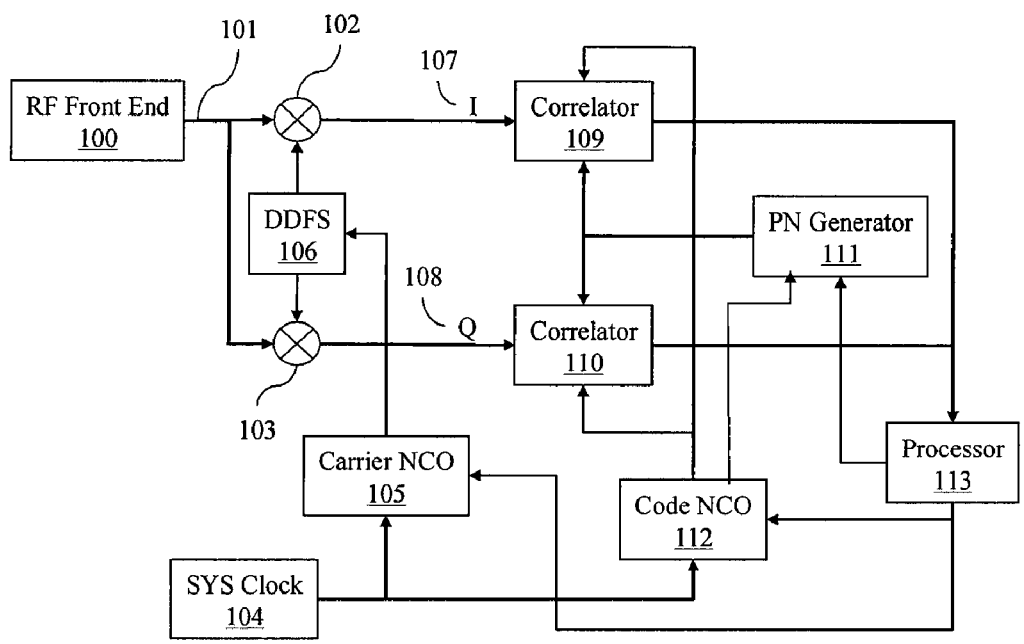
FIG. 1 schematically illustrates an exemplary baseband processor.

A receiver according to an embodiment of the present invention is illustrated in FIG. 1 as a functional block diagram of a GPS receiver. An RF front-end 100 processes the RF signal received at the antenna (not shown). Operations of a conversional RF front-end 100 include amplification, down-conversion, and analog-to-digital conversion. The RF front end 100 outputs an intermediate frequency (IF) signal 101 to a baseband section of the receiver from its analog-to-digital converter (ADC) output (not shown). The RF front-end 100 down converts the received RF into the intermediate frequency (IF) for baseband processing. The IF signal 101 is made available to two paths, one in-phase (I) and the other quadrature-phase (Q). In the I path, the IF signal 101 is multiplied in IF mixer 102 in-phase with a local frequency signal generated by a direct digital frequency synthesizer (DDFS) 106 to produce the in-phase (I) component 107. In the Q path, the same signal 101 is multiplied by the DDFS frequency quadrature-phase (i.e., with a phase shift of 90 degrees) to produce the quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase are almost the same as that of IF signal 101. As a result, the I and Q signals produced by the IF mixers 102 and 103 are near zero residue carrier frequency. In other words, the outputs I 107 and Q 108 of the IF mixers 102 and 103 are stripped or wiped off from the carrier (IF). The I and Q signals may be low-pass filtered to remove the high frequency components which are equal to twice the IF frequency band.

The I and Q components 107 and 108 are correlated in correlators 109 and 110, respectively, with a locally-generated pseudorandom (PN) sequence generated by a PN generator 111. The PN-sequence corresponds to the channel being processed by the baseband section at that time. The PN sequence generator is driven by code NCO 112. The local code generator frequency is made equal to the code rate of the I and Q paths by corrective feedback from the processor 113 to the code NCO 112. In addition, the processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113. Additional details of the receiver baseband section described above can be found in U.S. patent application Ser. No. 11/123,861, titled "Efficient And Flexible GPS baseband Architecture," filed on May 6, 2005, the specification of which is incorporated in its entirety herein by reference.

Figure 2:
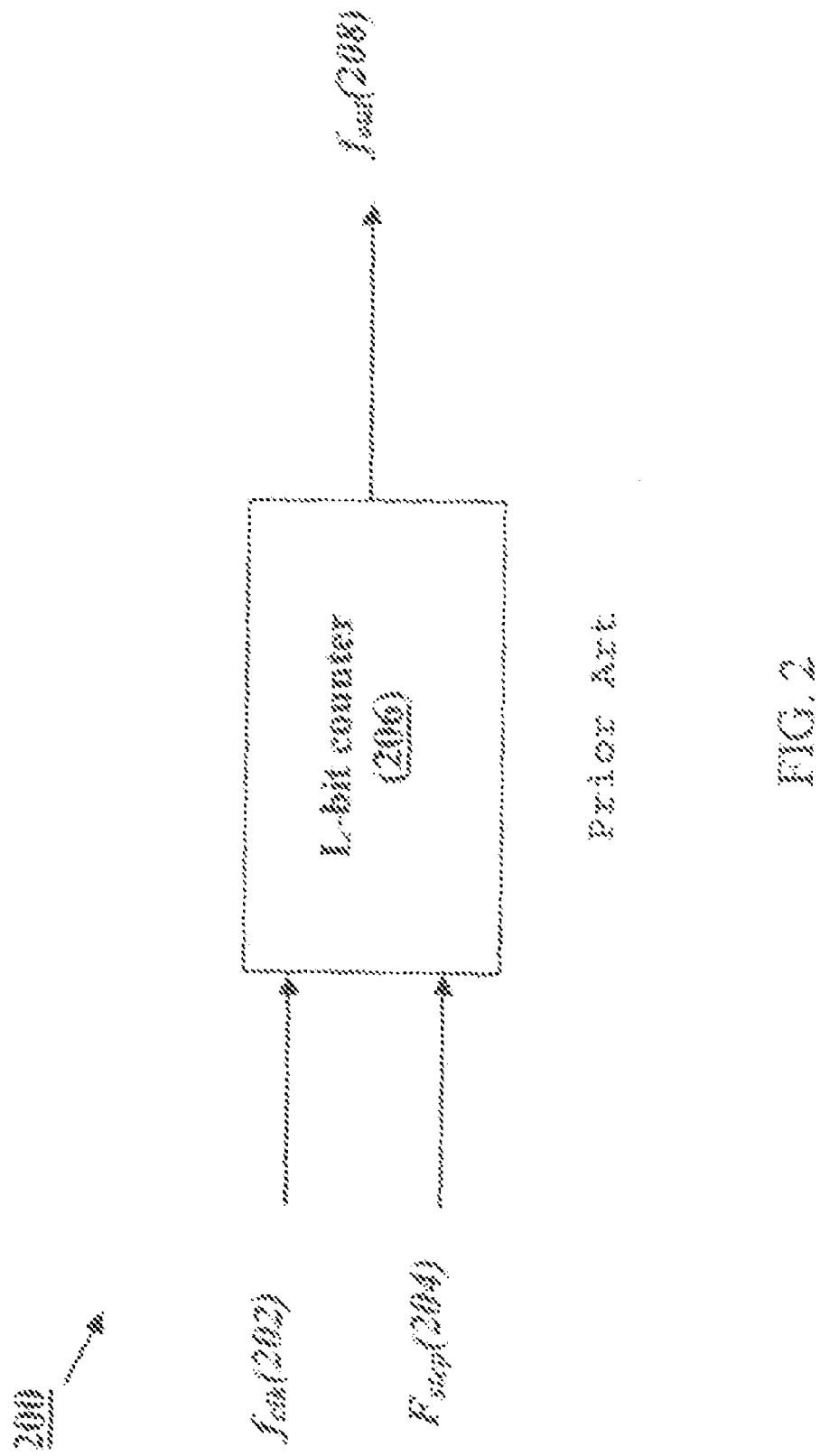
FIG. 2 illustrates a NCO according to the prior art.

As discussed earlier, GNSS receivers usually use NCOs to generate the carrier frequency as well as the code frequency. A prior art based carrier frequency generation scheme 200 is shown in FIG. 2. In this scheme 200, the output frequency $f_{out}$ 208 is fully controlled by a frequency control word or frequency step of $F_{step}$ 204. Each time the L-bit counter 206 receives a clock pulse from the system clock 104 at clock frequency $f_{clk}$ 202, the L-bit counter 206 adds the value of $F_{step}$ to the count value. When the counter 206 overflows, a pulse is generated and output at the output frequency $f_{out}$ 208. The output pulse occurs when the count value exceeds $2^L - 1$, where L is the number of bits of the counter 206. The output frequency $f_{out}$ of the counter 206 is given by:

$$f_{out} = \frac{F_{step}}{2^L} f_{clk} \quad \text{(Eq. 1)}$$

where $f_{clk}$ and $F_{step}$ are two inputs of the traditional NCO.

Figure 3:
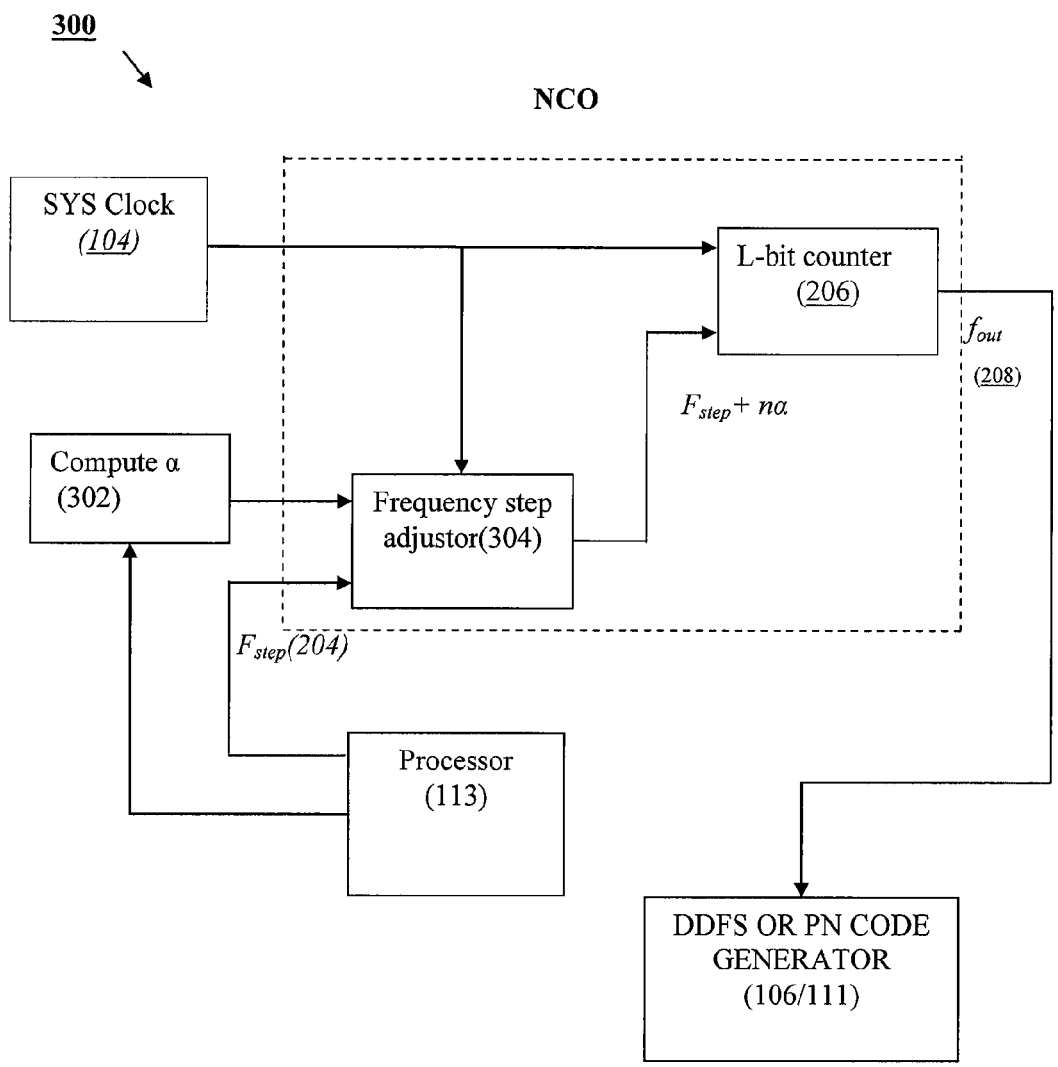
FIG. 3 illustrates a modified NCO according to an embodiment of the present invention.

A modified NCO 300 according to an embodiment of the invention is shown FIG. 3, in which a rate of change of frequency with time a is computed by module 302 and inputted to a frequency step adjustor 304. The frequency step adjustor 304 is used to adjust the value of $F_{step}$ by α at the input clock pulses. Preferably, α is stored in a register with m+n bits and the value of α is represented in a m.n format with m bits before and n bits after the binary point. Equivalently, the m bits or Most Significant Bits (MSBs) represent the integer part of α including a sign bit while the n bits or Least Significant Bits (LSBs) represent the fractional part of α.

At every input clock pulse 202, the frequency step adjuster 304 increases or decreases the frequency step $F_{step}$ by the integer part of α. At every two input clock pulses, based on the sign of α the frequency step adjuster 304 increases or decreases the frequency step $F_{step}$ by one if the first bit of the fractional part of α is 1. At every four input clock pulses, based on the sign of α the frequency step adjuster 304 increases or decreases the frequency step $F_{step}$ by one if the second bit of the fractional part of α is 1. At every $2^k$ input clock pulses, based on the sign of α the frequency step adjuster 304 increases or decreases the frequency step $F_{step}$ by one if the $k^{th}$ bit of the fractional part of α is 1.

The output frequency $f_{out}(n)$ corresponding to the $n^{th}$ input clock pulse is determined by:

$$f_{out}(n) = \frac{F_{step} + n\alpha}{2^L} f_{clk} \quad \text{(Eq. 2)}$$

where $F_{step}+n\alpha$ is the adjusted frequency step from the frequency step adjuster 304.

Similar to the prior NCO of FIG. 2, the modified NCO of FIG. 3 may receive the input clock from the system clock 104, and the frequency step $F_{step}$ from the processor 113. The modified NCO additionally receives the rate of change of frequency α from module 302 to adjust the frequency step $F_{step}$ in the frequency step adjuster 304. Exemplary methods of computing the rate of change of frequency α are given below. By adjusting the frequency step $F_{step}$ based on α, the modified NCO provides frequency and phase compensation to each sample of the input signal. This frequency and phase compensation enables long coherent integration of the correlated samples by the processor 113, thereby increasing the sensitivity of the receiver. As indicated in FIG. 3, the modified NCO may be used as a carrier NCO to provide the carrier frequency to the DDFS 106 or as a code NCO to provide the code frequency to the PN code generator 111.

Figure 4:
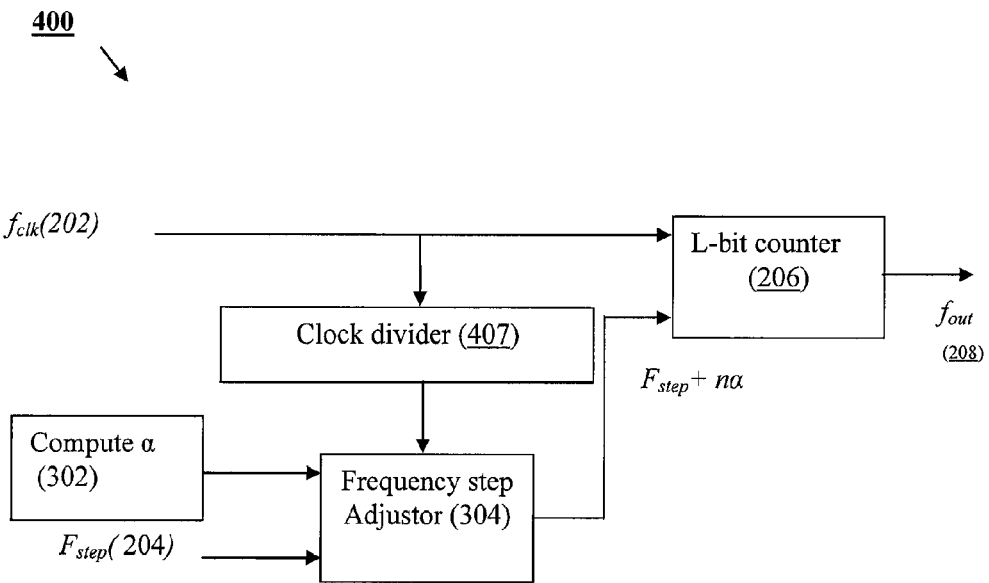
FIG. 4 illustrates the use of a clock divider in a modified NCO according to another embodiment of the present invention.

In some cases, the magnitude of α is very small and the frequency step need not be changed at every input clock pulse. FIG. 4 shows a modified NCO according to another embodiment, in which a clock divider 407 is added. The value of clock divider CD is set by baseband software and stored in a register. The input clock to the frequency step adjustor 304 is after the clock divider 407. In this embodiment, the frequency step is adjusted at every multiple of CD input clock pulses instead of at every clock pulse from the system clock. The remaining parts are the same as FIG. 3.

The output frequency corresponding to the $n^{th}$ input clock pulse is determined by:

$$f_{out}(n) = \frac{F_{step} + \text{int}\left(\frac{n}{CD}\right)\alpha}{2^L} f_{clk} \quad \text{(Eq. 3)}$$

where int(x) is an operation providing the maximum integer which is no more than the value of x.

Figure 5:
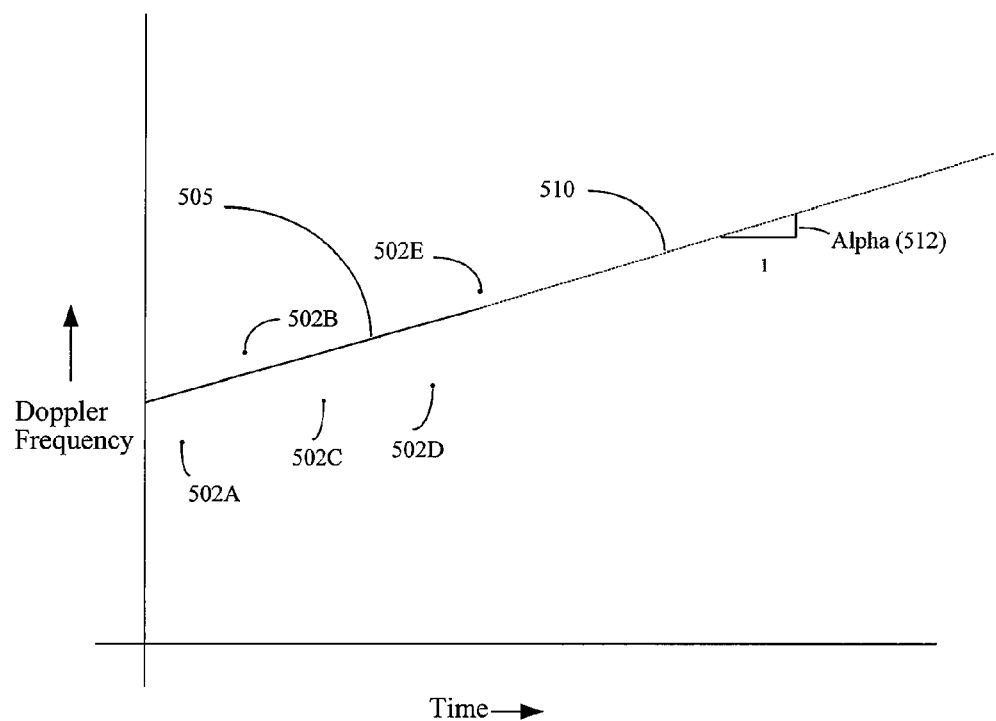
FIG. 5 illustrates an exemplary method of computing a rate of change of frequency.

Exemplary non-limiting methods of computing the rate of change of frequency α will now be given. The rate of change of frequency α may be computed from Doppler frequencies that are determined by actual measurements, using an orbital model or using current ephemeris. FIG. 5 shows an exemplary set of Doppler frequencies 502A, 502B, 502C, 502D, 502E, etc. over time. Each Doppler frequency may be computed by computing a Fast Fourier Transform (FFT) of correlated one millisecond samples, in which the peak value of the FFT gives the Doppler frequency. In another example, the Doppler frequency at a particular time may be computed by computing the relative velocity of a satellite to the receiver, and using the relative velocity to find the corresponding Doppler frequency. The velocity of the satellite may be computed by using an orbital model or ephemeris for that satellite stored in the receiver. The orbital model or ephemeris provides parameters for computing the velocity of the satellite as a function of time. When the receiver is relatively stationary, the rate of change of the Doppler frequency α can be assumed to be constant over a period of several minutes. Thus, the prediction can be linear with the rate of change of the Doppler frequency α being constant. This rate of change can be predicted using a Least-Mean-Square (LMS) error approach to find a line that best fits the set of Doppler frequencies, where the rate of change is given by the slope of the line. This rate of change α is valid for a period of several minutes assuming the receiver is mostly stationary. An example of this is shown in FIG. 5, in which a linear line 505 is fitted to the set of Doppler frequencies 502A, 502B, 502C, 502D, 502E, etc., and the slope of the line 505 is used to determine alpha, α, 512. The rate of change need not be assumed to be linear and higher-order frequency dependencies may be taken into account by fitting a higher-order polynomial to the set of Doppler frequencies. For a dynamic situation, a Kalman filtering technique may be used to estimate the Doppler frequency and rate of change of Doppler frequency. Additional details on the computation of α can be found in U.S. patent application Ser. No. 11/612,421, titled "Ephemeris Download from Weak Signals" filed on Dec. 18, 2006, the specification of which is incorporated in its entirety herein by reference.

In the GNSS receiver of FIG. 1, $f_{clk}$ is from the system clock 104. $F_{step}$ and α are stored in two registers respectively, which can be accessed by the processor 113. Before integration, the frequency and the frequency change rate of the next integration interval are set by software. Thus, the output frequency is not a fixed frequency, instead it is a linear variation with the change rate of α. If the value of α is set to zero, the modified NCO is equal to the traditional NCO with the fixed output frequency.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and ground based systems such as pseudolites. Further all types of communication systems where a stable reference frequency or sync signal is available can be considered as reference signal source. Accordingly, it is intended that the appended claims be interpreted as covering all alterations and modifications as fall within the spirit and scope of the invention.

I claim:

1. A Numerical Controlled Oscillator (NCO) in a navigational receiver, comprising:
    a frequency step adjuster, wherein the frequency step adjuster is configured to receive a frequency step and a rate of change of frequency, and to adjust the frequency step based on the rate of change of frequency; and
    a counter coupled to the frequency step adjuster, wherein the counter is configured to receive the adjusted frequency step from the frequency step adjuster and an input clock frequency, and to output an output frequency based on the adjusted frequency step and the input clock frequency.

2. The NCO of claim 1, wherein the frequency step adjustor comprises an adder and a register to store the prior frequency.

3. The NCO of claim 1, wherein the frequency step adjustor comprises a register to store the rate of change of frequency in a suitable format.

4. The NCO of claim 1, wherein the rate of change of frequency is in a binary format, and at every $2^k$ input clock pulses, the frequency step adjuster increases or decreases the frequency step by one based on the value of a $k^{th}$ bit of a fractional part of the rate of change of frequency.

5. The NCO of claim 1, further comprising a clock divider to divide the input clock frequency to the frequency step adjuster by a predetermined amount.

6. The NCO of claim 1, wherein the frequency step and the rate of change of frequency to the NCO are set by baseband receiver firmware.

7. The NCO of claim 3, wherein an on-chip or off-chip processor provides the frequency step and the rate of change of frequency to the frequency step adjuster.

8. The NCO of claim 7, wherein the processor is a general purpose DSP, RISC or an ASIC.

9. The NCO of claim 1, wherein the frequency step and the rate of change of frequency inputted to the NCO are adjusted while the NCO is running.

10. The NCO of claim 1, wherein the frequency step and the rate of change of frequency are set based on desired values of the output frequency.

11. The NCO of claim 1, wherein the rate of change of frequency can be set to zero to make the NCO backward compatible with traditional or prior art NCO.

12. The NCO of claim 1, wherein the NCO is implemented at least partially in software or hardware.

13. The NCO of claim 1, wherein the output frequency of the NCO is coupled to a frequency mixer of the receiver.

14. The NCO of claim 1, wherein the output frequency of the NCO is coupled to a pseudorandom (PN) code generator of the receiver.

15. A method of operating a navigation receiver, comprising:
    receiving a rate of change of frequency and a frequency step at a Numerical Controlled Oscillator (NCO);
    adjusting the received frequency step based on the received rate of change of frequency to generate an adjusted frequency step;
    receiving an input clock frequency at the NCO;
    computing an output frequency as a function of the adjusted frequency step and the input clock frequency; and
    inputting the output frequency of the NCO to a frequency mixer to wipe off residue carrier frequency or to a pseudorandom (PN) code generator to provide a code frequency.

16. The method of claim 15, further comprising:
    providing the rate of change of frequency is in a binary format; and
    at every $2^k$ input clock pulses, increasing or decreasing the frequency step by one based on the value of a $k^{th}$ bit of a fractional part of the rate of change of frequency.

17. The method of claim 15, further comprising:
    computing Doppler frequencies over time based on relative velocities of a satellite to the receiver; and
    computing the rate of change of frequency based on the computed Doppler frequencies.

18. The method of claim 17, further comprising:
    computing the relative velocities of the satellite to the receiver using a satellite orbital model or ephemeris stored in the receiver.

19. The method of claim 17, further comprising:
    computing the rate of change of frequency by fitting a linear function to the Doppler frequencies.

20. The method of claim 15, further comprising:
    measuring Doppler frequencies of an input signal over time; and
    computing the rate of change of frequency based on the measured Doppler frequencies.

21. The method of claim 20, further comprising:
    computing the rate of change of frequency by fitting a linear function to the Doppler frequencies.

22. The method of claim 15, wherein the NCO comprises a counter, the method further comprising:
    inputting the adjusted frequency step and the input clock frequency to the counter;
    increasing a count value of the counter by the adjusted frequency step at each pulse of the input clock frequency; and
    outputting a pulse from the counter when the count value overflows the counter.

23. The method of claim 22, further comprising:
    dividing the input clock frequency by a predetermined amount; and
    inputting the divided clock to adjust the frequency step.

* * * * *

UNITED STATES PATENT AND TRADEMARK OFFICE
CERTIFICATE OF CORRECTION

PATENT NO. : 7,830,951 B2
APPLICATION NO. : 11/694296
DATED : November 9, 2010
INVENTOR(S) : Jia It is certified that error appears in the above-identified patent and that said Letters Patent is hereby corrected as shown below:

In Column 5, Line 27, delete "time a" and insert -- time $\alpha$ --, therefor.

Signed and Sealed this
Nineteenth Day of March, 2013

Teresa Stanek Rea
*Acting Director of the United States Patent and Trademark Office*